(12) United States Patent
Pak (10) Patent No.: US 11,681,986 B2
(45) Date of Patent: Jun. 20, 2023

(54) WORK CREDIT TRANSACTION SYSTEM

(71) Applicant: ITZ MARKETING CO., LTD., Hiroshima (JP)

(72) Inventor: Hyonil Pak, Hiroshima (JP)

(73) Assignee: ITZ CO., LTD., Hiroshima (JP)

( * ) Notice: Subject to any disclaimer, the term of this patent is extended or adjusted under 35 U.S.C. 154(b) by 0 days.

(21) Appl. No.: 16/973,289

(22) PCT Filed: Apr. 16, 2020

(86) PCT No.: PCT/JP2020/016725
§ 371 (c)(1),
(2) Date: Dec. 8, 2020

(87) PCT Pub. No.: WO2020/218153
PCT Pub. Date: Oct. 29, 2020

(65) Prior Publication Data
US 2021/0090029 A1   Mar. 25, 2021

(30) Foreign Application Priority Data

Apr. 25, 2019   (JP) .............................. JP2019-083642

(51) Int. Cl.
*G06Q 40/02*   (2023.01)
*G06Q 10/1091*   (2023.01)
(Continued)

(52) U.S. Cl.
CPC ..... *G06Q 10/1091* (2013.01); *G06F 16/1837* (2019.01); *G06Q 20/0658* (2013.01);
(Continued)

(58) Field of Classification Search
None
See application file for complete search history.

(56) References Cited

U.S. PATENT DOCUMENTS 9,202,250 B1 * 12/2015 Palaniappan ........ G06Q 40/125
11,068,978 B1 * 7/2021 Ferreira .............. G06Q 40/025
(Continued)

FOREIGN PATENT DOCUMENTS

CN   113272850 A * 8/2021 ............. G06Q 10/04
JP   2003-16237 A   1/2003
(Continued)

OTHER PUBLICATIONS

Aste et al., Blockchain Technologies: The Foreseeable Impact on Society and Industry, Published in: Computer (vol. 50, Issue: 9, pp. 18-28), Sep. 22, 2017 (https://ieeexplore.ieee.org/document/8048633) (Year: 2017).*

(Continued)

*Primary Examiner* — Paul S Schwarzenberg
(74) *Attorney, Agent, or Firm* — Ruggiero McAllister & McMahon LLC (57) ABSTRACT

In the labor claim transaction system in response to a selection of a claim to be sold, a worker node notifies an employer node of a sale application, and records the buyer and the sale amount. When determining that there is no problem with the claim to be sold, the employer node records sale approval information in a distributed ledger, and notifies a buyer node of a sale approval notification. When determining that there is no problem with the claim to be sold, the buyer node records buying approval information in the distributed ledger, and notifies a financial institution node of the sale approval notification. The financial institution mode checks that the sale approval information and the buying approval information are recorded, and records sale amount transfer completion information.

9 Claims, 8 Drawing Sheets

(51) Int. Cl.
  *G06Q 40/12* (2023.01)
  *G06F 16/182* (2019.01)
  *G06Q 20/06* (2012.01)
  *G06Q 20/36* (2012.01)
  *G06Q 40/00* (2023.01)
  *G06Q 20/38* (2012.01)

(52) U.S. Cl.
  CPC ......... *G06Q 20/3678* (2013.01); *G06Q 40/02* (2013.01); *G06Q 40/125* (2013.12); *G06Q 20/389* (2013.01); *G06Q 40/00* (2013.01)

(56) References Cited

U.S. PATENT DOCUMENTS

2019/0130399 A1* 5/2019 Wright .................. H04L 9/3297
2021/0248603 A1* 8/2021 Wu ....................... H04L 9/0643
2021/0365918 A1* 11/2021 Showalter ............ G06Q 20/326

FOREIGN PATENT DOCUMENTS

| | | | |
|---|---|---|---|
| JP | 6363254 | B1 | 7/2018 |
| JP | 6413110 | B1 | 10/2018 |
| JP | 2018-190156 | A | 11/2018 |
| KR | 2022021337 | A * | 2/2022 |
| WO | 02/23421 | A1 | 3/2002 |

OTHER PUBLICATIONS

International Search Report dated Jul. 14, 2020 from corresponding International Patent Application No. PCT/JP2020/016725, 5 pages.
Written Opinion dated Jul. 14, 2020 from corresponding International Patent Application No. PCT/JP2020/016725, 9 pages.

* cited by examiner

Fig. 8

WORK CREDIT TRANSACTION SYSTEM

CROSS REFERENCE TO RELATED APPLICATIONS

This application is a U.S. National Stage Application under 35 U.S.C. § 371 of International Application No. PCT/JP2020/016725 filed on Apr. 16, 2020, which claims the benefit of Japanese Patent Application No. JP-2019-083642 filed on Apr. 25, 2019 the contents of both are incorporated by reference herein in their entirety.

BACKGROUND OF THE DISCLOSURE

1. Field of the Disclosure

The present invention relates to a labor claim transaction system that performs a transaction of a labor claim where part of the wage of a worker can be claimed from the employer.

2. Description of the Related Art

Conventionally, a salary system has been proposed for temporary staffing companies that dispatch persons who provide labor for a comparatively short period such as one day, several weeks or several months (for example, see Patent Literature 1).

Specifically, according to Patent Literature 1, at the point of time when accounts receivable are fixed with respect to a salary payment to a dispatched person (worker), a financial institution (buyer) such as a bank buys the accounts receivable, and in exchange for the buying, the amount corresponding to the salary is paid to the dispatched person. For the accounts receivable to be fixed, it is certified that labor was provided as scheduled at the company to which the worker was dispatched. Moreover, the temporary staffing company pays a commission to the financial institution in exchange for this service.

As another technology, a payment supporting system has been proposed that supports efficient payment by using an infrastructure system capable of checking the validity of debt recording information by using a distributed ledger technology (for example, see Patent Literature 2).

CITATION LIST

Patent Literature

[Patent Literature 1] Japanese Laid-Open Patent Publication No. 2003-016237
[Patent Literature 2] Japanese Patent No. 6363254

SUMMARY OF INVENTION

According to the system of Patent Literature 1, the financial institution (buyer) such as a bank buys the accounts receivable owned by the temporary staffing company (employer), which enables the dispatched person (worker) to receive the amount corresponding to the salary before the salary payment day.

However, the accounts receivable described in Patent Literature 1 are a claim issued not to the dispatched person (worker) but to the temporary staffing company (employer). Therefore, the dispatched person (worker) has no right with respect to the accounts receivable, and cannot sell the accounts receivables to a third party based on the worker's own intension. For this reason, to receive an advance salary payment service according to Patent Literature 1, there is no other choice but for the temporary staffing company (employer) to sell the accounts receivables to the financial institution (buyer) such as a bank as a business-to-business transaction (B to B), and it is impossible for each individual worker to initiatively execute a transaction. Moreover, in the system described in Patent Literature 1, since the advance salary payment service can be received only from the financial institution (buyer) having a partnership with the temporary staffing company (employer), the dispatched person (worker) has to unconditionally accept the conditions (commission, etc.) determined between the temporary staffing company (employer) and the financial institution (buyer).

Accordingly, an object of the present invention is to provide a labor claim transaction system that enables each individual worker to initiatively perform a transaction of a labor claim by issuing, to the worker, a labor claim where part of the wage can be claimed from the employer.

To attain the above-mentioned object, the present invention is a labor claim transaction system having a distributed ledger for each of a plurality of nodes connected by a peer-to-peer network to record data of the same contents in a shared state; the distributed ledger records information on a labor claim where part of a wage of a worker can be claimed from an employer as a claim amount; the nodes include an employer node, a worker node, a mediator node, a plurality of buyer nodes and a financial institution node; the employer node records, in the distributed ledger, information on a new labor claim issued based on the worker's attendance information, and transmits a notification of issuance of the new labor claim to the mediator node; the mediator node verifies the new labor claim in response to the issuance notification, and when determining that there is no problem with the new labor claim, records issuance approval information in the distributed ledger as information on the new labor claim; in response to a selection, by the worker, of a claim to be sold that is to be sold to a specific buyer from among a plurality of buyers, the worker node records the specific buyer and a sale amount based on a buying condition of the specific buyer in the distributed ledger as buyer information on the claim to be sold, and notifies the employer node of an application for sale of the claim to be sold; the employer node verifies the claim to be sold in response to the sale application, and when determining that there is no problem with the claim to be sold, records sale approval information in the distributed ledger as information on the claim to be sold, and notifies a specific buyer node corresponding to the specific buyer of a notification of approval of sale of the claim to be sold; the specific buyer node verifies the claim to be sold in response to the sale approval notification, and when determining that there is no problem with the claim to be sold, records buying approval information in the distributed ledger as information on the claim to be sold, and notifies the financial institution node of a notification of approval of buying of the claim to be sold; and when the sale approval information and the buying approval information are recorded in the distributed ledger as information on the claim to be sold, the financial institution node executes transfer processing to transfer the sale amount from the specific buyer's account to the worker's account, and then, records sale amount transfer completion information in the distributed ledger.

Preferably, the information on the claim to be sold includes a payment date when the claim amount is paid to the specific buyer; the financial institution node identifies the claim to be sold the payment date of which is reached with reference to the distributed ledger, executes transfer processing to transfer the claim amount of the identified claim to be sold, from the employer's account to the specific buyer's account, and then, records claim amount transfer completion information in the distributed ledger and transmits a notification of completion of transfer of the claim amount, to the mediator node; and in response to the transfer completion notification, the mediator node records invalidation information to invalidate the claim to be sold in the distributed ledger as information on the claim to be sold.

Preferably, in response to a selection, by the worker, of a claim to be divided, the worker node records division application information as information on the claim to be divided and notifies the employer node of an application for division of the claim to be divided; the employer node verifies the division application, and when determining that there is no problem with the division application, records division approval information in the distributed ledger as information on the claim to be divided, records information on a plurality of divisional labor claims in the distributed ledger, and transmits a division notification to the mediator node; and in response to the division notification, the mediator node verifies the divisional labor claims, and when determining that there is no problem with the divisional labor claims, records the division approval information in the distributed ledger as information on the divisional labor claims, and records the invalidation information in the distributed ledger as information on the claim to be divided.

Preferably, the employer node determines that there is no problem with the division application on condition that the claim to be divided is issued by the employer and that the claim amount of the claim to be divided and the total amount of the claim amounts of the divisional labor claims coincide with each other; and the mediator node determines that there is no problem with the divisional labor claims on condition that the division application information and the division approval information are recorded as the information on the claim to be divided and that the divisional labor claims are issued according to the contents of the divisional application.

Preferably, the information on the labor claim includes a sale deadline; and the mediator node identifies, as a non-sold labor claim, the labor claim the sale deadline of which is reached without being sold to any of the buyers, and records the invalidation information in the distributed ledger as information on the non-sold labor claim.

Preferably, the mediator node determines that there is no problem with the new labor claim on condition that the new labor claim is issued within the employer's issuance authority and that the buyer information is not recorded as the information on the new labor claim.

Preferably, the employer node determines that there is no problem with the claim to be sold on condition that the claim to be sold is issued by the employer; and the specific buyer node determines that there is no problem with the claim to be sold on condition that the sale approval information is recorded as the information on the claim to be sold.

Moreover, the present invention is a labor claim transaction system having a distributed ledger for each of a plurality of nodes connected by a peer-to-peer network to record data of the same contents in a shared state; the distributed ledger records information on a labor claim where part of a wage of a worker can be claimed from an employer as a claim amount; the nodes include an employer node, a worker node, a mediator node, a plurality of buyer nodes and a financial institution node; the worker node transmits, to the employer node, an application for issuance of a new labor claim corresponding to a claim amount specified by the worker based on attendance information approved by the employer; in response to the issuance application, the employer node records information on the new labor claim in the distributed ledger, and transmits a notification of issuance of the new labor claim to the mediator node; the mediator node verifies the new labor claim in response to the issuance notification, and when determining that there is no problem with the new labor claim, records issuance approval information in the distributed ledger as information on the new labor claim; in response to a selection, by the worker, of a claim to be sold that is to be sold to a specific buyer from among a plurality of buyers, the worker node records the specific buyer and a sale amount based on a buying condition of the specific buyer in the distributed ledger as buyer information on the claim to be sold, and notifies the employer node of an application for sale of the claim to be sold; the employer node verifies the claim to be sold in response to the sale application, and when determining that there is no problem with the claim to be sold, records sale approval information in the distributed ledger as information on the claim to be sold, and notifies a specific buyer node corresponding to the specific buyer of a notification of approval of sale of the claim to be sold; the specific buyer node verifies the claim to be sold in response to the sale approval notification, and when determining that there is no problem with the claim to be sold, records buying approval information in the distributed ledger as information on the claim to be sold, and notifies the financial institution node of a notification of approval of buying of the claim to be sold; and when the sale approval information and the buying approval information are recorded in the distributed ledger as information on the claim to be sold, the financial institution node executes transfer processing to transfer the sale amount from the specific buyer's account to the worker's account, and then, records sale amount transfer completion information in the distributed ledger.

Further, the present invention is a labor claim transaction system having a distributed ledger for each of a plurality of nodes connected by a peer-to-peer network to record data of the same contents in a shared state; the distributed ledger records information on a labor claim where part of a wage of a worker can be claimed from an employer as a claim amount; the nodes include an employer node, a worker node, a mediator node and a buyer node; the employer node records, in the distributed ledger, information on a new labor claim issued based on the worker's attendance information, and transmits a notification of issuance of the new labor claim to the mediator node; the mediator node verifies the new labor claim in response to the issuance notification, and when determining that there is no problem with the new labor claim, records issuance approval information in the distributed ledger as information on the new labor claim; the worker node records the buyer corresponding to the buyer node and a sale amount based on a buying condition of the buyer in the distributed ledger as buyer information on the claim to be sold, and notifies the employer node of an application for sale of the claim to be sold; the employer node verifies the claim to be sold in response to the sale application, and when determining that there is no problem with the claim to be sold, records sale approval information in the distributed ledger as information on the claim to be sold, and notifies the buyer node of a notification of approval of sale of the claim to be sold; the buyer node verifies the claim to be sold in response to the sale approval notification, and when determining that there is no problem with the claim to be sold, records the buying approval information in the distributed ledger as information on the claim to be sold; and after executing transfer processing to transfer the sale amount from the buyer's account to the worker's account, records sale amount transfer completion information in the distributed ledger.

According to the present invention, a labor claim where part of the wage can be claimed from the employer is issued to the worker by using the distributed ledger technology. For this reason, the worker can select the buyer of the labor claim from among a plurality of buyers with the worker's own will and sell it. In short, it is possible for each individual worker to initiatively perform a transaction of the labor claim.

DESCRIPTION OF EMBODIMENTS

1. Embodiment

A labor claim transaction system 1 according to an embodiment of the present invention will be described with reference to FIGS. 1 to 6.

Figure 1:
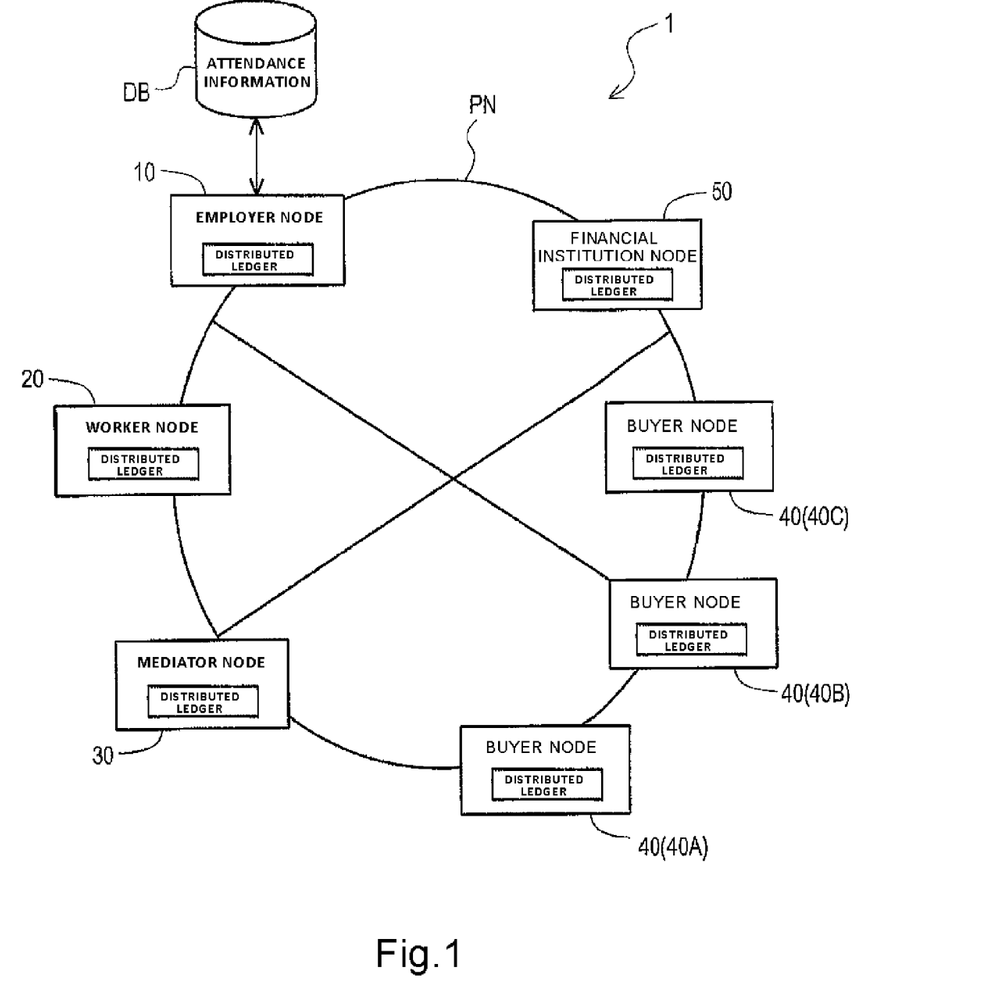
FIG. 1 is a view showing a schematic structure of a labor claim transaction system according to an embodiment of the present invention.

As shown in FIG. 1, the labor claim transaction system 1 is a system for performing a transaction of a labor claim by sharing information on the labor claim (see FIG. 2) by using a known distributed ledger technology by a peer-to-peer (P2P) network PN.

In the following, a labor claim named BillCoin will be shown as an example of the labor claim according to the present invention. BillCoin is an original claim that the employer (hirer) issues to the worker as a claim where part of the wage (specifically, approximately 60 to 70% of the amount of paid salary) of a worker can be claimed from the employer.

The worker can sell BillCoin to a specific buyer under a predetermined condition (buying at 95% of the claim amount, etc.). Thereby, the worker can cash part of the wage before the salary payment day by paying the buyer a commission (in the case where the buying condition is 95% of the claim amount, the commission is 5%). In the present system, since the buyer of the BillCoin is selected from among a plurality of buyers, the worker can select a buyer presenting a better buying condition. Moreover, since a plurality of buyers are present, the market principle acts, so that the possibility is high that a buying condition advantageous for the worker is set.

For BillCoin, the deadline for the sale to the buyer is set. The expired BillCoin automatically disappears, and the claim amount of the BillCoin having disappeared is paid together with the remaining salary at the salary payment day. That is, when no advance salary payment is necessary, the worker can make a choice to make the BillCoin disappear without selling it and receive the claim amount of the BillCoin in full at the salary payment day.

When the BillCoin is sold, since the date of payment to the buyer is set, the buyer can receive the claim amount from the employer when the payment date arrives. That is, by buying the BillCoin, the buyer receives the claim amount of the BillCoin from the employer at the payment date, and can obtain, as a profit, the difference between the received claim amount and the buying amount actually paid to the worker. That is, the buyer can make a profit margin by the BillCoin.

Moreover, by the BillCoin being issued to the worker and the worker being allowed to sell the BillCoin to a specific buyer, it is unnecessary for the employer to secure cash for an advance salary payment before the salary payment day.

As shown in FIG. 1, the labor claim transaction system 1 is provided with an employer node 10, a worker node 20, a mediator node 30, a plurality of buyer nodes 40 (40A to 40C) and a financial institution node 50 as a plurality of nodes connected through the P2P (peer-to-peer) network PN.

In the present embodiment, it is assumed that the labor claim transaction system 1 is implemented by a single computer by the P2P network PN constructed within a single computer. More specifically, the labor claim transaction system 1 is designed so that the nodes 10, 20, 30, 40 and 50 to which individual IP addresses are set function as API nodes in a single computer. Thereby, in a single computer, the nodes perform P2P communication with the other nodes and execute various kinds of processing as appropriate. Various kinds of approval processing (described later) executed between the nodes are automatically executed by a known smart contract technology.

While a case where the P2P network PN is constructed in a single computer is shown here as an example, the present invention is not limited thereto; the P2P network PN may be constructed by using a plurality of computers. That is, the labor claim transaction system 1 may be designed so that a plurality of computers interconnected by the P2P network PN function as the above-described nodes 10, 20, 30, 40 and 50, respectively.

The employer node 10, the worker node 20, the mediator node 30, the buyer nodes 40 (40A to 40C) and the financial institution node 50 share information on the BillCoin recorded on a distributed ledger.

The employer node 10 is structured so as to be capable of accessing an attendance database DB. In the attendance database DB, the workers' attendance information recorded through a non-illustrated time recorder is accumulated. The attendance database DB may exist either in a storage device of the computer where the labor claim transaction system 1 is constructed or in an external storage device capable of communication with the computer. It is assumed that the employer node 10 is previously approved by the employer (hirer) as the node for performing the issuance of new BillCoin and the like.

It is assumed that the worker node 20 is previously approved by the worker in order to perform the sale of the owned BillCoin and the like. It is assumed that the buyer nodes 40 are previously approved by the buyer in order to perform the buying of the BillCoin and the like. It is assumed that the financial institution node 50 is previously approved by the financial institution as the node for executing transfer processing.

The nodes 10, 20, 30, 40 and 50 each own a distributed ledger for recording data of the same contents in a shared state. The distributed ledgers of the nodes 10, 20, 30, 40 and 50 record the above-described BillCoin information (see FIG. 2).

Figure 2:
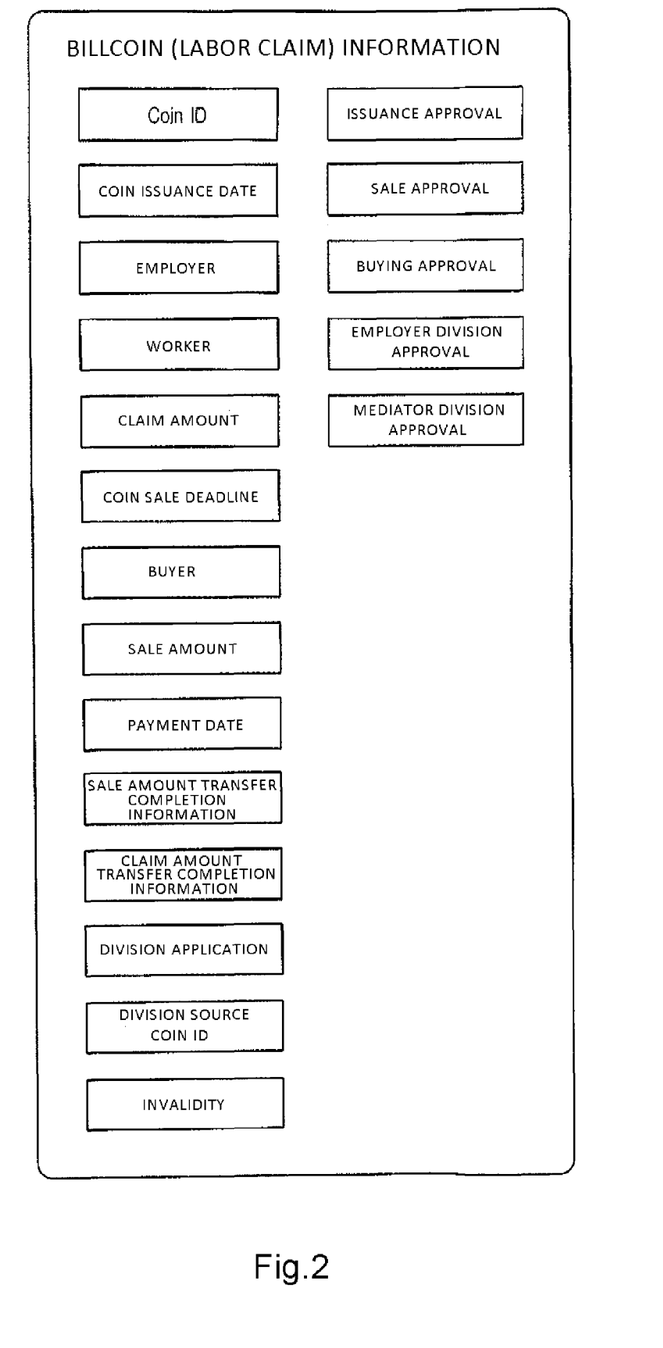
FIG. 2 is a view showing claim information on the labor claim.

As shown in FIG. 2, the BillCoin information is provided with "Coin ID", "Coin issuance date", "Employer", "Worker", "Claim amount" and "Coin sale deadline". "Coin ID" records an identifier for identifying the BillCoin. "Coin issuance date" records the date when the BillCoin is issued. "Employer" records information on the employer having issued the BillCoin (information to identify the employer, etc.). "Worker" records information on the worker owning the BillCoin (information to identify the worker, etc.). "Claim amount" records the claim amount of the BillCoin. "Coin sale deadline" records the deadline until when the BillCoin can be sold to the buyer (sale due date, etc.). These six pieces of information are recorded at the time of issuance of the BillCoin.

Moreover, the BillCoin information is provided with "Buyer", "Sale amount", "Payment date", "Sale amount transfer completion information", "Claim amount transfer completion information", "Division application" "Division source coin ID" and "Invalidity". "Buyer" records information on the buyer of the BillCoin (information to identify the buyer, etc.). "Sale amount" records the sale amount at the time of sale to the buyer. "Payment date" records the date of payment to the BillCoin buyer. "Sale amount transfer completion information" records information indicating that the transfer of the sale amount is completed. "Claim amount transfer completion information" records information indicating that the transfer of the claim amount is completed. "Division application" records information on an application for BillCoin division. As the information on the division application, for example, the claim amount of each of a plurality of divisional BillCoins is recorded. "Division source coin ID" records the Coin ID of the BillCoin to be divided. "Invalidity" records invalidation information to invalidate the BillCoin. These eight pieces of information are recorded only when the BillCoin is sold or divided.

Further, the BillCoin information is provided with "Issuance approval", "Sale approval", "Buying approval", "Employer division approval" and "Mediator division approval". "Issuance approval" records information on the approval of BillCoin issuance by the mediator. "Sale approval" records information on the approval of BillCoin sale by the employer. "Buying approval" records information on the approval of BillCoin buying by the buyer. "Employer division approval" records information on the approval of BillCoin division by the employer. "Mediator division approval" records information on the approval of BillCoin division by the mediator.

The BillCoin information as described above is recorded for every newly issued BillCoin. Specifically, using a known block-chain method, one piece of BillCoin information is regarded as one block, and a block (BillCoin information) is added in a chain form every time BillCoin is issued. The block is formed of a header and a transaction. The header includes information on the block and information on the immediately preceding block. The transaction records concrete BillCoin information.

Subsequently, referring to the sequence diagram shown in FIG. 3, the processing accompanying the issuance and disappearance of BillCoin will be described in detail.

Figure 3:
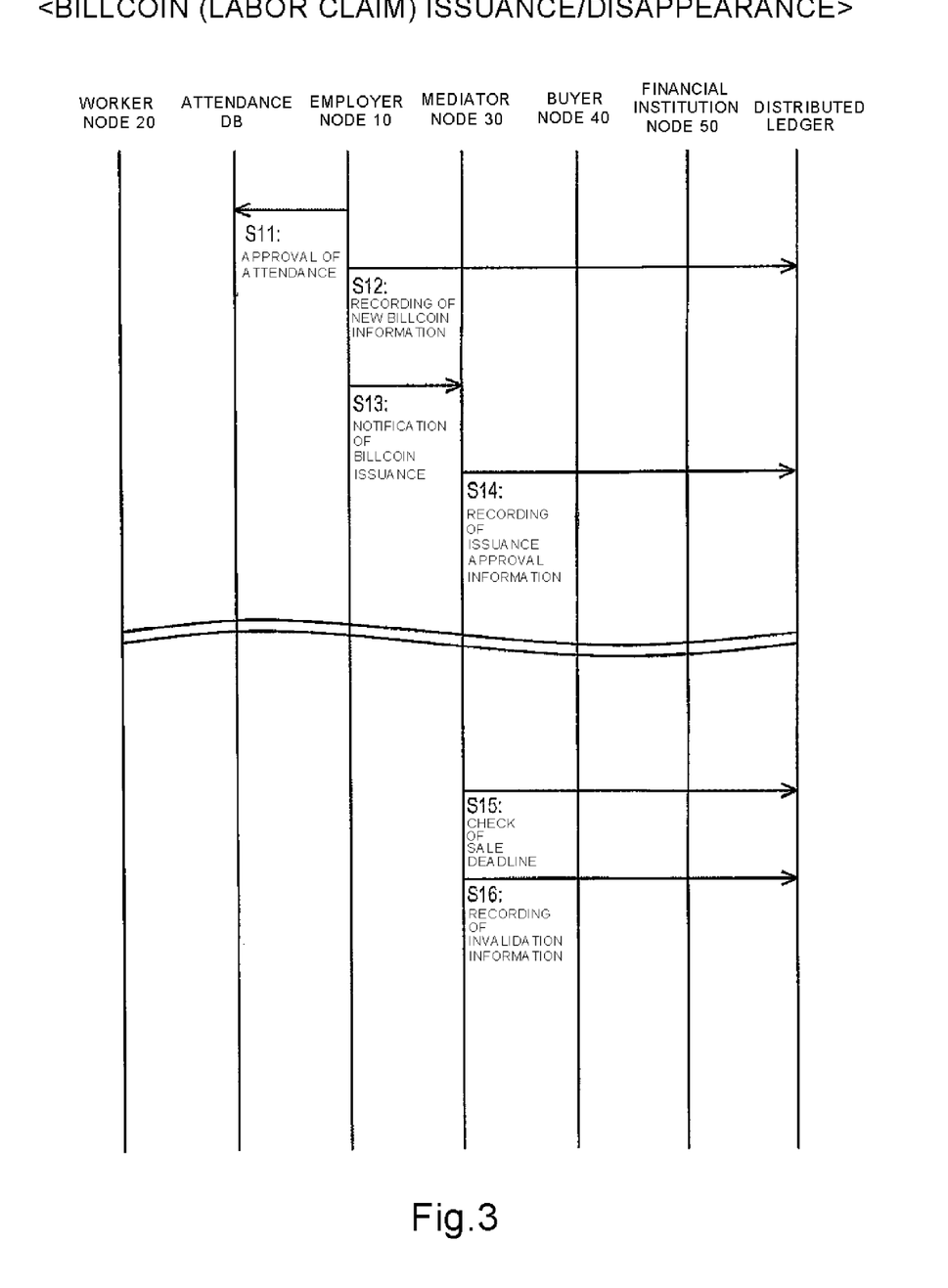
FIG. 3 is a sequence diagram showing processing related to issuance and disappearance of the labor claim.

As shown in FIG. 3, the employer node 10 approves attendance information with reference to the attendance database DB recording the worker's attendance information (step S11). For the approval of the attendance information, the person in charge on the employer side may check and approve it one by one, or the information may be automatically approved with the recorded attendance information being regarded as correct.

The employer node 10 issues new BillCoin based on the approved attendance information, and records information on the new BillCoin in the distributed ledger (step S12). As described above, at the time of BillCoin issuance, six pieces of information, "Coin ID", "Coin issuance date", "Employer", "Worker", "Claim amount" and "Coin sale deadline" are automatically recorded. "Claim amount" records an amount corresponding to part (for example, 60 to 70%) of the wage by a predetermined calculation formula. Moreover, "Coin sale deadline" records the deadline previously set by the employer (for example, two weeks after the issuance).

After the information on the new BillCoin is recorded, the employer node 10 transmits a new BillCoin issuance notification to the mediator node 30 (step S13).

In response to the new BillCoin issuance notification, the mediator node 30 verifies the new BillCoin recorded in the distributed ledger. On condition that the new BillCoin is issued within the employer's issuance authority and that "Buyer information" of the BillCoin information is not recorded, the mediator node 30 determines that there is no problem with the new BillCoin.

When determining that there is no problem with the new BillCoin, the mediator node 30 records information on the approval of the new BillCoin issuance by the mediator in the distributed ledger (specifically, "Issuance approval" of the BillCoin information) (step S14).

By the above-described processing of steps S11 to S14, the new BillCoin is issued to the worker, so that the worker owns the BillCoin.

As described above, the worker can either sell the BillCoin before the sale deadline to receive cash early or receive the claim amount in full at the salary payment day together with the remaining wage without selling it before the sale deadline.

The labor claim transaction system 1 executes the processing of steps S15 and S16 of FIG. 3 when the worker does not sell the BillCoin before the sale deadline.

Specifically, referring to the BillCoin information, the mediator node 30 identifies, as non-sold BillCoin, the BillCoin the sale deadline of which is reached without being sold to the buyer (step S15). Specifically, the mediator node 30 identifies, as non-sold BillCoin, the BillCoin where buyer information is not recorded in "Buyer" and "Coin sale deadline" is past.

The mediator node 30 records "invalidation information" to invalidate the non-sold BillCoin identified at step S15 in the distributed ledger (specifically, "Invalidity" of the BillCoin information) (step S16).

By the above-described processing of steps S15 and S16, the BillCoin disappears, and the claim amount of the BillCoin is added to the remaining wage and paid to the worker on the salary payment date as usual.

Figure 4:
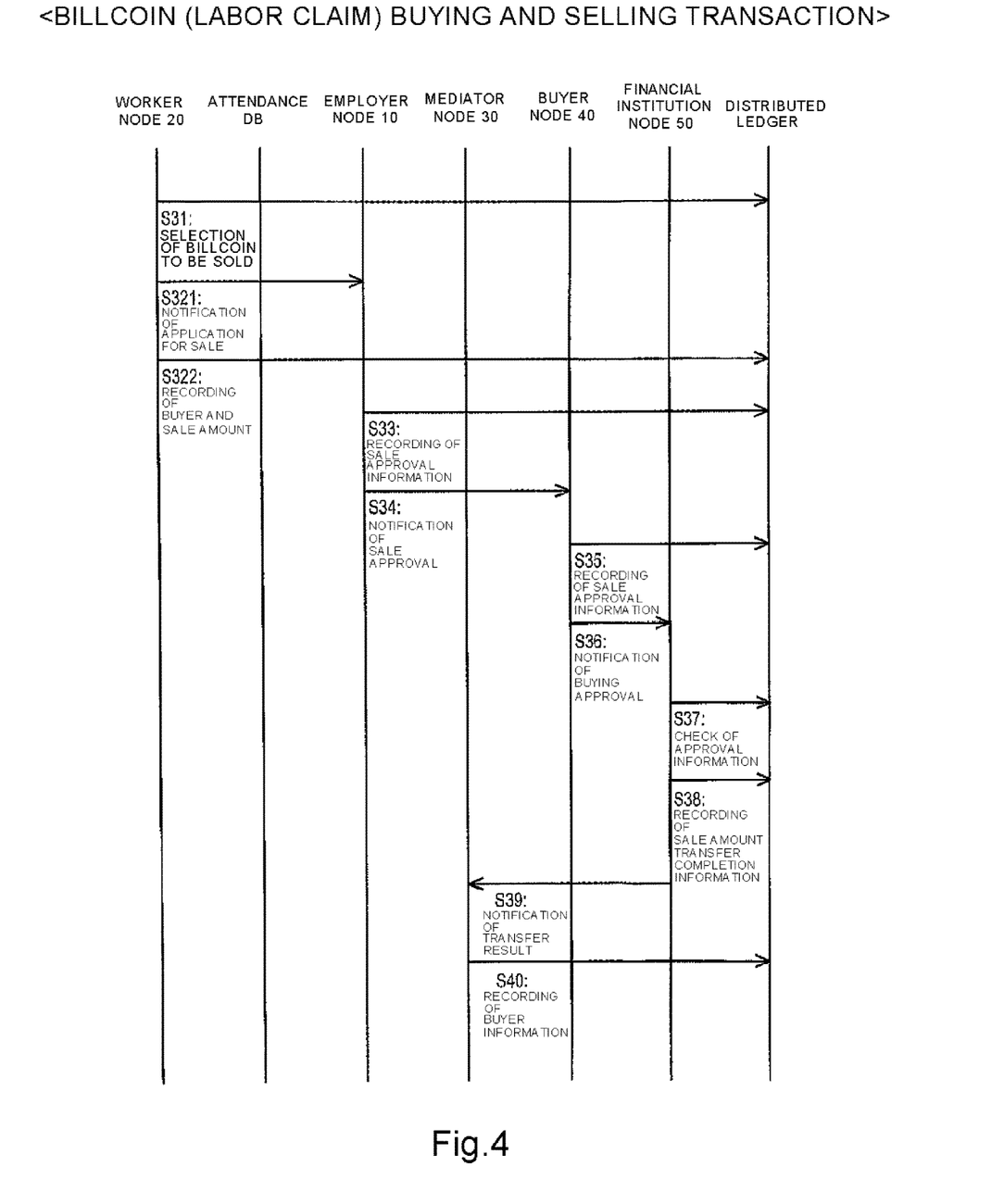
FIG. 4 is a sequence diagram showing processing related to a buying and selling transaction of the labor claim.

Then, referring to the sequence diagram of FIG. 4, the processing when the worker sells BillCoin to a specific buyer will be described.

First, according to the worker's selection operation, the worker node 20 selects BillCoin to be sold, from among the BillCoin owned by the worker, and selects the buyer of the BillCoin to be sold, from among the buyers 40A to 40C (step S31). Then, the worker node 20 notifies the employer node 10 of an application for sale of the BillCoin to be sold (step S321). Moreover, the worker node 20 records the buyer of the BillCoin to be sold and the sale amount based on the sale condition of the buyer in the distributed ledger (specifically, "Buyer" of the BillCoin information) (step S322). Here, description will be given on the assumption that the buyer 40A is selected as the buyer of the BillCoin to be sold.

In response to the sale application from the worker node 20, the employer node 10 verifies the BillCoin to be sold. On condition that the BillCoin to be sold is issued by the employer, the employer node 10 determines that there is no problem with the BillCoin to be sold.

When determining that there is no problem with the BillCoin to be sold, the employer node 10 records information on the approval of sale of the BillCoin to be sold by the employer in the distributed ledger (specifically, "Sale approval" of the BillCoin information) (step S33). Then, the employer node 10 transmits a notification of approval of sale of the BillCoin to be sold, to the buyer node 40A (step S34).

In response to the sale approval notification from the employer node 10, the buyer node 40A verifies the BillCoin to be sold. On condition that the information on the approval of sale by the employer is recorded in "Sale approval", the buyer node 40A determines that there is no problem with the BillCoin to be sold.

When determining that there is no problem with the BillCoin to be sold, the buyer node 40A records the information on the approval of buying of the BillCoin to be sold by the buyer in the distributed ledger (specifically, "Buying approval" of the BillCoin information) (step S35). Then, the buyer node 40A transmits a notification of approval of buying of the BillCoin to be sold, to the financial institution node 50 (step S36).

Referring to the distributed ledger, the financial institution node 50 checks whether the sale approval information and the buying approval information are recorded as information on the sold BillCoin or not (step S37).

When determining that the sale approval information and the buying approval information are recorded, the financial institution node 50 executes transfer processing to transfer the sale amount recorded as the BillCoin information of the BillCoin to be sold, from the buyer's account to the worker's account. When the transfer processing is completed, the financial institution node 50 records sale amount transfer completion information indicating that the transfer of the sale amount is completed, in the distributed ledger (specifically, "Sale amount transfer completion information" of the BillCoin information) (step S38).

Then, the financial institution node 50 notifies the mediator node 30 of the transfer result (specifically, recording of the sale amount transfer completion information in the distributed ledger) (step S39). In response to the notification of the transfer result, the mediator node 30 verifies the sale amount transfer completion information recorded in the distributed ledger, and when determining that there is no problem therewith, the mediator node 30 records information on the buyer of the BillCoin in the distributed ledger (specifically, "Buyer" of the BillCoin information) (step S40). Accordingly, the right to own the BillCoin shifts from the worker to the specific buyer.

By the above-described processing of steps S31 to S39, the BillCoin is sold from the worker to the buyer, and the buyer becomes the new owner of the BillCoin.

Figure 5:
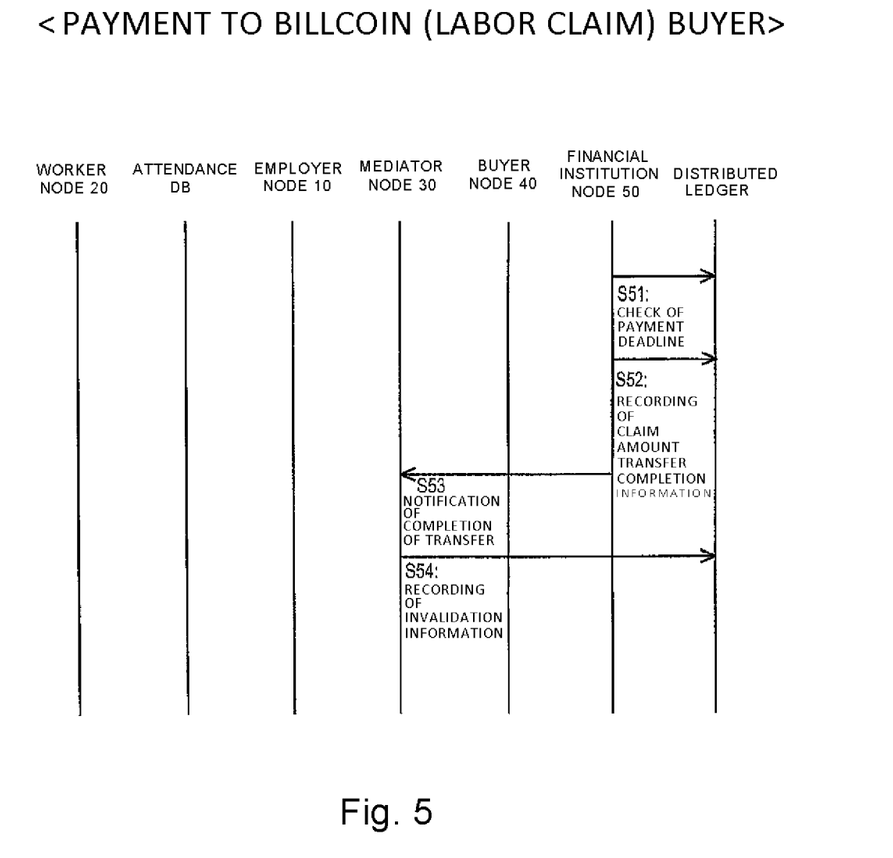
FIG. 5 is a sequence diagram showing processing related to payment to the labor claim buyer.

The labor claim transaction system 1 executes the processing of steps S51 to S53 shown in FIG. 5 as the processing of payment to the buyer.

Specifically, referring to the BillCoin information (specifically, "Payment date"), the financial institution node 50 identifies the BillCoin the payment deadline of which is reached, as the BillCoin to be paid (step S51). While "Payment date" is recorded by the employer node 10 at the time of issuance of new BillCoin in the present embodiment, the present invention is not limited thereto; for example, it may be recorded by the mediator node 30 at the time of completion of buying and selling.

When the BillCoin to be paid is identified, the financial institution node 50 executes the transfer processing to transfer the claim amount from the employer's account to the buyer's account.

When the transfer processing is completed, the financial institution node 50 records claim amount transfer completion information indicating that the transfer of the claim amount is completed, in the distributed ledger (specifically, "Claim amount transfer completion information" of the BillCoin information) (step S52). Moreover, the financial institution node 50 transmits a transfer completion notification to the mediator node 30 (step S53).

In response to the reception of the transfer completion notification from the financial institution node 50, the mediator node 30 records "invalidation information" to invalidate the BillCoin to be paid, in the distributed ledger (specifically, "Invalidity" of the BillCoin information) (step S54).

A case is considered where a worker wants to cash part of the claim amount of the BillCoin owned by the worker himself/herself. In the labor claim transaction system 1, it is possible to execute division processing to divide the BillCoin to be divided selected by the worker, into a plurality of BillCoins.

Figure 6:
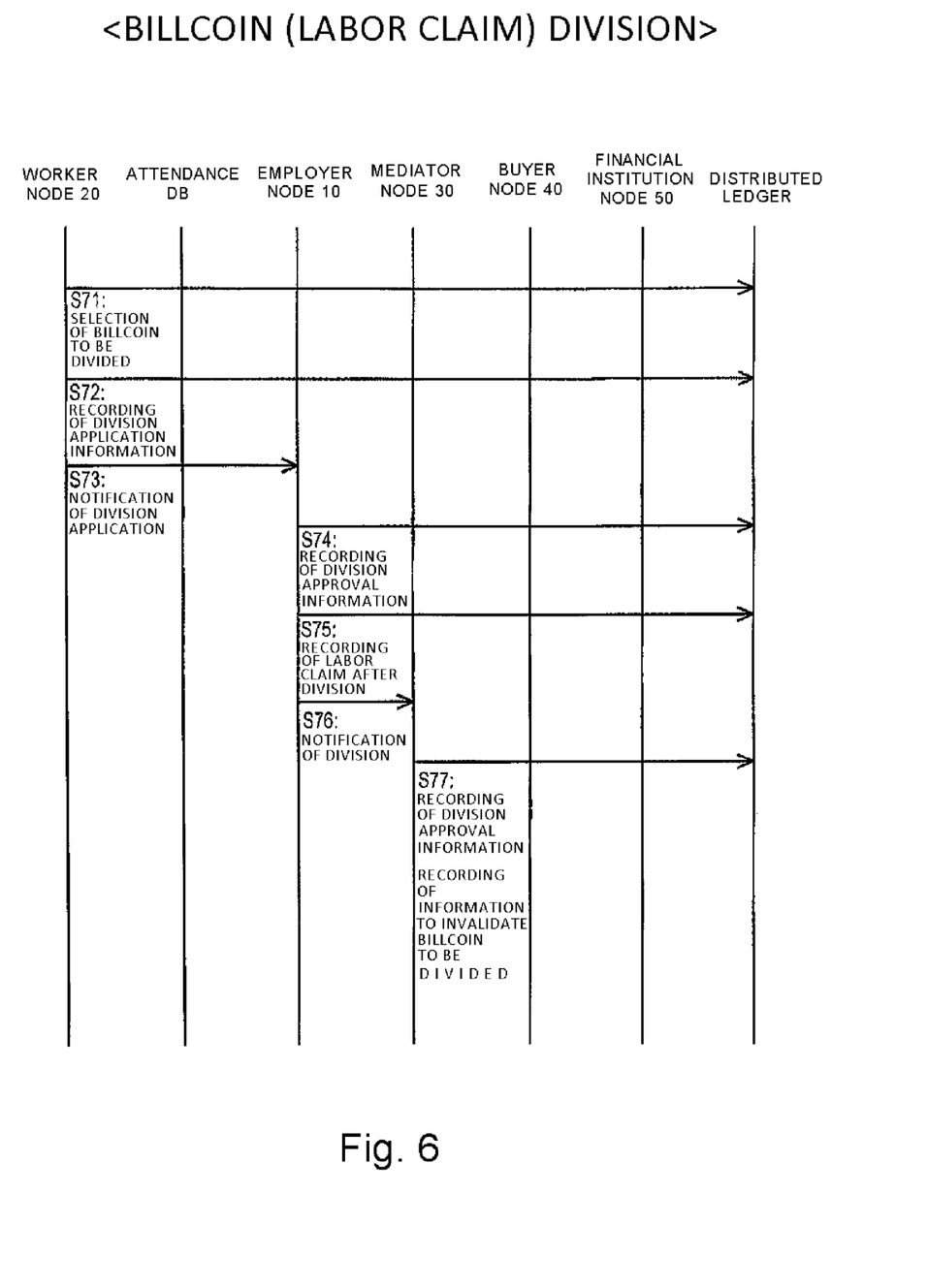
FIG. 6 is a sequence diagram showing processing related to division of the labor claim.

Hereinafter, referring to the sequence diagram of FIG. 6, the division processing for the worker to divide BillCoin will be described.

First, the worker node 20 selects the BillCoin to be divided, from among the BillCoin owned by the worker according to the worker's selection operation (step S71).

Then, the worker node 20 records division application information in the distributed ledger (specifically, "Division application" of the BillCoin information) (step S72). The division application information includes the fact that division application has been made and the claim amount of the divisional BillCoins.

Then, the worker node 20 transmits a notification of application for division of the BillCoin to be divided, to the employer node 10 (step S73).

In response to the division application notification from the worker node 20, the employer node 10 verifies the BillCoin to be divided. Specifically, on condition that the BillCoin to be divided is issued by the employer and that the claim amount of the BillCoin to be divided and the total amount of the claim amounts of the divisional BillCoins coincide with each other, the employer node 10 determines that there is no problem with the application for the division of the BillCoin to be divided.

When determining that there is no problem with the application for the division of the BillCoin to be divided, the employer node 10 records information on the approval of division of the BillCoin to be divided by the employer, in the distributed ledger (specifically, "Employer division approval" of the BillCoin information) (step S74). Moreover, the employer node 10 records information on the divisional BillCoins in the divisional ledger (step S75). In the information on the divisional BillCoins, "Division coin source ID" shown in FIG. 2 is recorded. The employer node 10 transmits a BillCoin division notification to the mediator node 30 (step S76).

In response to the BillCoin division notification from the employer node 10, the mediator node 30 verifies the divisional BillCoins. Specifically, on condition that the division application information and the division approval information are recorded as information on the BillCoin to be divided and that the divisional BillCoins are issued according to the contents of the division application, the mediator node 30 determines that there is no problem with the divisional BillCoins.

When determining that there is no problem with the divisional BillCoins, the mediator node 30 records the division approval information as information on the divisional BillCoins, in the distributed ledger (specifically, "Mediator division approval" of the BillCoin information), and records "invalidation information" to invalidate the BillCoin to be divided, in the distributed ledger (specifically, "Invalidity" of the BillCoin information) (step S77).

By the above-described processing of steps S71 to S77, the BillCoin to be divided selected by the worker can be divided into a plurality of divisional BillCoins.

According to the above-described embodiment, BillCoin where part of the wage can be claimed from the employer is issued to the worker by using the distributed ledger technology. For this reason, the worker can select the buyer of BillCoin from among a plurality of buyers with the worker's own will and sell it. In short, it is possible for each individual worker to initiatively perform a transaction of the labor claim.

2. Modification

The labor claim transaction system according to the present invention is not limited to the above-described embodiment, and various modifications and improvements are possible within the scope of the claims.

For example, while a case where the BillCoin information is recorded by the known block-chain method is shown as an example in the above-described embodiment, the present invention is not limited thereto. A different method may be adopted as long as the distributed ledger technology is used where the same data is held among a plurality of nodes connected to the P2P network.

Moreover, while in the present embodiment, a case where the employer node 10 issues new BillCoin (step S12) and records information on the new BillCoin in the distributed ledger (step S13) as shown in FIG. 3 is shown as an example, the present invention is not limited thereto.

Figure 7:
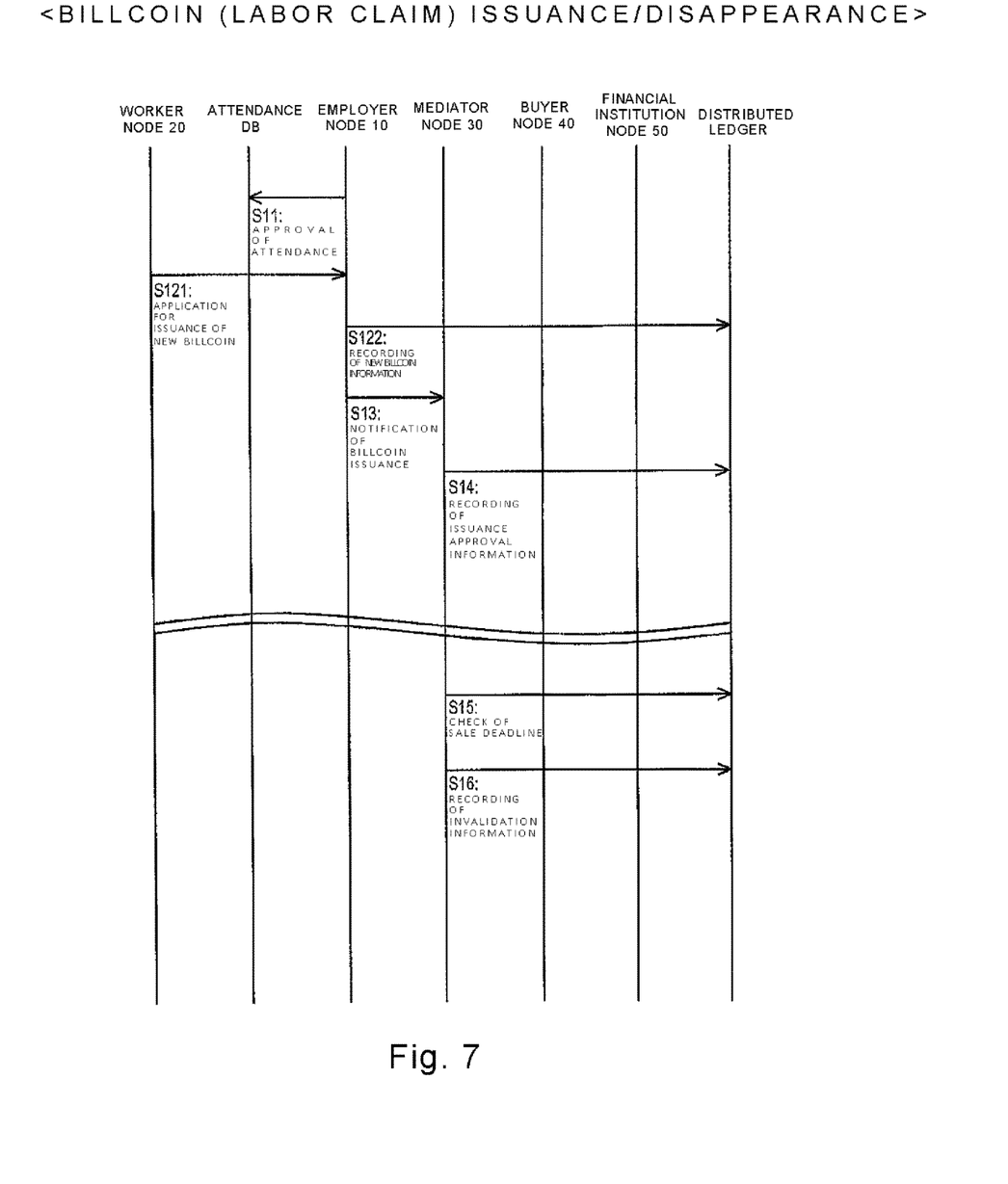
FIG. 7 is a sequence diagram showing processing related to a buying and selling transaction according to a modification.

As shown in FIG. 7, the worker node 20 may apply with the employer node 10 for the issuance of new BillCoin corresponding to the claim amount specified by the worker based on the attendance information (step S121). Then, the employer node 10 may record information on the new BillCoin in the distributed ledger based on the contents of the issuance application (step S122).

Moreover, while a case where the buyer and the financial institution are different is shown as an example in the above-described embodiment, the present invention is not limited thereto, and these may be the same.

Figure 8:
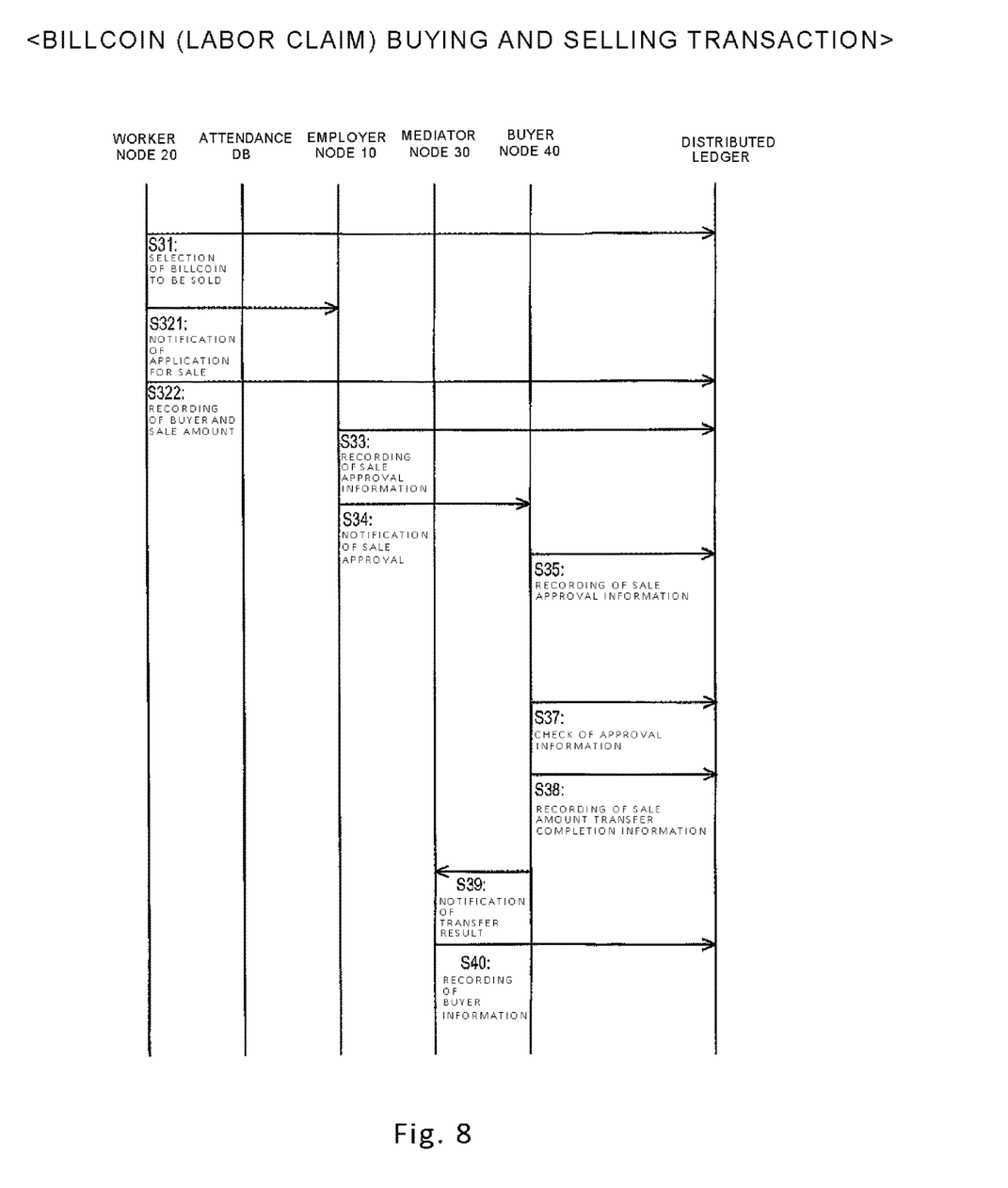
FIG. 8 is a sequence diagram showing processing related to issuance and disappearance of the labor claim.

Concretely, the financial institution itself buys BillCoin as the buyer from the worker. Specifically, as shown in FIG. 8, the processing performed by the financial institution node 50 (steps S37, S38 and S39 of FIG. 4) in the above-described embodiment is performed by the buyer node 40 which is a financial institution. In that case, the processing of step S36 of FIG. 4 (buying approval notification) is absent in FIG. 8 because it is unnecessary. Although not shown, the processing of steps S51, S52 and S53 of FIG. 5 is also performed by the buyer node 40 which is a financial institution.

INDUSTRIAL APPLICABILITY

As described above, according to the labor claim transaction system of the present invention is suitable for performing a transaction of a labor claim where part of the wage is made into credit.

DESCRIPTION OF REFERENCE CHARACTERS

1 Labor claim transaction system
10 Employer node
20 Worker node
30 Mediator node
40(40A to 40C) Buyer node
50 Financial institution node
DB Attendance database
PN P2P network

What is claimed is:

1. A labor claim transaction system having a distributed ledger for each of a plurality of nodes connected by a peer-to-peer network to record data of the same contents in a shared state, wherein the peer-to-peer network is constructed by a single computer or a plurality of computers, wherein each of the plurality of nodes to which individual IP addresses are set function as API nodes in the single computer when the peer-to-peer network is constructed in the single computer, or each of the plurality of computers interconnected by the peer-to-peer network function as each of the plurality of nodes when the peer-to-peer network is constructed in the plurality of computers, wherein the distributed ledger records information on a labor claim where part of a wage of a worker can be claimed from an employer as a claim amount, the nodes include an employer node, a worker node, a mediator node, a plurality of buyer nodes and a financial institution node, the employer node records, in the distributed ledger, information on a new labor claim issued based on the worker's attendance information, and transmits a notification of issuance of the new labor claim to the mediator node, the mediator node verifies the new labor claim in response to the issuance notification, and when determining that there is no problem with the new labor claim, records issuance approval information in the distributed ledger as information on the new labor claim, in response to a selection, by the worker, of a claim to be sold that is to be sold to a specific buyer from among a plurality of buyers, the worker node records the specific buyer and a sale amount based on a buying condition of the specific buyer in the distributed ledger as buyer information on the claim to be sold, and notifies the employer node of an application for sale of the claim to be sold, the employer node verifies the claim to be sold in response to the sale application, and when determining that there is no problem with the claim to be sold, records sale approval information in the distributed ledger as information on the claim to be sold, and notifies a specific buyer node corresponding to the specific buyer of a notification of approval of sale of the claim to be sold, the specific buyer node verifies the claim to be sold in response to the sale approval notification, and when determining that there is no problem with the claim to be sold, records buying approval information in the distributed ledger as information on the claim to be sold, and notifies the financial institution node of a notification of approval of buying of the claim to be sold, and when the sale approval information and the buying approval information are recorded in the distributed ledger as information on the claim to be sold, the financial institution node executes transfer processing to transfer the sale amount from the specific buyer's account to the worker's account, and then, records sale amount transfer completion information in the distributed ledger, wherein in response to a selection, by the worker, of a claim to be divided, the worker node records division application information as information on the claim to be divided and notifies the employer node of an application for division of the claim to be divided, wherein the employer node verifies the division application, and when determining that there is no problem with the division application, records division approval information in the distributed ledger as information on the claim to be divided, records information on a plurality of divisional labor claims in the distributed ledger, and transmits a division notification to the mediator node, wherein the mediator node verifies the divisional labor claims in response to the division notification, and when determining that there is no problem with the divisional labor claims, records the division approval information in the distributed ledger as information on the divisional labor claims, and records the invalidation information in the distributed ledger as information on the claim to be divided, wherein the information on the labor claim includes a sale deadline, wherein the mediator node identifies, as a non-sold labor claim, the sale deadline of the labor claim that is reached without being sold to any of the buyers, and records the invalidation information in the distributed ledger as information on the non-sold labor claim.

2. The labor claim transaction system according to claim 1, wherein the information on the claim to be sold includes a payment date when the claim amount is paid to the specific buyer, the financial institution node identifies the claim to be sold the payment date of which is reached with reference to the distributed ledger, executes transfer processing to transfer the claim amount of the identified claim to be sold, from the employers account to the specific buyer's account, and then, records claim amount transfer completion information in the distributed ledger and transmits a notification of completion of transfer of the claim amount, to the mediator node, and in response to the transfer completion notification, the mediator node records invalidation information to invalidate the claim to be sold in the distributed ledger as information on the claim to be sold.

3. The labor claim transaction system according to claim 1, wherein the employer node determines that there is no problem with the division application on condition that the claim to be divided is issued by the employer and that the claim amount of the claim to be divided and the total amount of the claim amounts of the divisional labor claims coincide with each other, and the mediator node determines that there is no problem with the divisional labor claims on condition that the division application information and the division approval information are recorded as the information on the claim to be divided and that the divisional labor claims are issued according to the contents of the divisional application.

4. The labor claim transaction system according to claim 1, wherein the mediator node determines that there is no problem with the new labor claim on condition that the new labor claim is issued within the employer's issuance authority and that the buyer information is not recorded as the information on the new labor claim.

5. The labor claim transaction system according to claim 1, wherein the employer node determines that there is no problem with the claim to be sold on condition that the claim to be sold is issued by the employer, and the specific buyer node determines that there is no problem with the claim to be sold on condition that the sale approval information is recorded as the information on the claim to be sold.

6. A labor claim transaction system having a distributed ledger for each of a plurality of nodes connected by a peer-to-peer network to record data of the same contents in a shared state, wherein the peer-to-peer network is constructed by a single computer or a plurality of computers, wherein each of the plurality of nodes to which individual IP addresses are set function as API nodes in the single computer when the peer-to-peer network is constructed in the single computer, or each of the plurality of computers interconnected by the peer-to-peer network function as each of the plurality of nodes when the peer-to-peer network is constructed in the plurality of computers, wherein the distributed ledger records information on a labor claim where part of a wage of a worker can be claimed from an employer as a claim amount, the nodes include an employer node, a worker node, a mediator node, a plurality of buyer nodes and a financial institution node, the worker node transmits, to the employer node, an application for issuance of a new labor claim corresponding to a claim amount specified by the worker based on attendance information approved by the employer, in response to the issuance application, the employer node records information on the new labor claim in the distributed ledger, and transmits a notification of issuance of the new labor claim to the mediator node, the mediator node verifies the new labor claim in response to the issuance notification, and when determining that there is no problem with the new labor claim, records issuance approval information in the distributed ledger as information on the new labor claim, in response to a selection, by the worker, of a claim to be sold that is to be sold to a specific buyer from among a plurality of buyers, the worker node records the specific buyer and a sale amount based on a buying condition of the specific buyer in the distributed ledger as buyer information on the claim to be sold, and notifies the employer node of an application for sale of the claim to be sold, the employer node verifies the claim to be sold in response to the sale application, and when determining that there is no problem with the claim to be sold, records sale approval information in the distributed ledger as information on the claim to be sold, and notifies a specific buyer node corresponding to the specific buyer of a notification of approval of sale of the claim to be sold, the specific buyer node verifies the claim to be sold in response to the sale approval notification, and when determining that there is no problem with the claim to be sold, records buying approval information in the distributed ledger as information on the claim to be sold, and notifies the financial institution node of a notification of approval of buying of the claim to be sold, and when the sale approval information and the buying approval information are recorded in the distributed ledger as information on the claim to be sold, the financial institution node executes transfer processing to transfer the sale amount from the specific buyer's account to the worker's account, and then, records sale amount transfer completion information in the distributed ledger, wherein in response to a selection, by the worker, of a claim to be divided the worker node records division application information as information on the claim to be divided and notifies the employer node of an application for division of the claim to be divided, wherein the employer node verifies the division application, and when determining that there is no problem with the division application, records division approval information in the distributed ledger as information on the claim to be divided, records information on a plurality of divisional labor claims in the distributed ledger and transmits a division notification to the mediator node, wherein the mediator node verifies the divisional labor claims in response to the division notification, and when determining that there is no problem with the divisional labor claims, records the division approval information in the distributed ledger as information on the divisional labor claims and records the invalidation information in the distributed ledger as information on the claim to be divided, wherein the information on the labor claim includes a sale deadline, wherein the mediator node identifies, as a non-sold labor claim the sale deadline of the labor claim that is reached without being sold to any of the buyers, and records the invalidation information in the distributed ledger as information on the non-sold labor claim.

7. A labor claim transaction system having a distributed ledger for each of a plurality of nodes connected by a peer-to-peer network to record data of the same contents in a shared state, wherein the peer-to-peer network is constructed by a single computer or a plurality of computers, wherein each of the plurality of nodes to which individual IP addresses are set function as API nodes in the single computer when the peer-to-peer network is constructed in the single computer, or each of the plurality of computers interconnected by the peer-to-peer network function as each of the plurality of nodes when the peer-to-peer network is constructed in the plurality of computers, wherein the distributed ledger records information on a labor claim where part of a wage of a worker can be claimed from an employer as a claim amount, the nodes include an employer node, a worker node, a mediator node and a buyer node, the employer node records, in the distributed ledger, information on a new labor claim issued based on the worker's attendance information, and transmits a notification of issuance of the new labor claim to the mediator node, the mediator node verifies the new labor claim in response to the issuance notification, and when determining that there is no problem with the new labor claim, records issuance approval information in the distributed ledger as information on the new labor claim, the worker node records the buyer corresponding to the buyer node and a sale amount based on a buying condition of the buyer in the distributed ledger as buyer information on the claim to be sold, and notifies the employer node of an application for sale of the claim to be sold, the employer node verifies the claim to be sold in response to the sale application, and when determining that there is no problem with the claim to be sold, records sale approval information in the distributed ledger as information on the claim to be sold, and notifies the buyer node of a notification of approval of sale of the claim to be sold, the buyer node verifies the claim to be sold in response to the sale approval notification, and when determining that there is no problem with the claim to be sold, records the buying approval information in the distributed ledger as information on the claim to be sold, and after executing transfer processing to transfer the sale amount from the buyer's account to the worker's account, records sale amount transfer completion information in the distributed ledger, wherein in response to a selection, by the worker, of a claim to be divided the worker node records division application information as information on the claim to be divided and notifies the employer node of an application for division of the claim to be divided, wherein the employer node verifies the division application, and when determining that there is no problem with the division application, records division approval information in the distributed ledger as information on the claim to be divided, records information on a plurality of divisional labor claims in the distributed ledger, and transmits a division notification to the mediator node, wherein the mediator node verifies the divisional labor claims in response to the division notification, and when determining that there is no problem with the divisional labor claims, records the division approval information in the distributed ledger as information on the divisional labor claims, and records the invalidation information in the distributed ledger as information on the claim to be divided, wherein the information on the labor claim includes a sale deadline, wherein the mediator node identifies, as a non-sold labor claim, the sale deadline of the labor claim that is reached without being sold to any of the buyers, and records the invalidation information in the distributed ledger as information on the non-sold labor claim.

8. The labor claim transaction system according to claim 6, wherein the information on the claim to be sold includes a payment date when the claim amount is paid to the specific buyer, the financial institution node identifies the claim to be sold the payment date of which is reached with reference to the distributed ledger, executes transfer processing to transfer the claim amount of the identified claim to be sold, from the employers account to the specific buyer's account, and then, records claim amount transfer completion information in the distributed ledger and transmits a notification of completion of transfer of the claim amount, to the mediator node, and in response to the transfer completion notification, the mediator node records invalidation information to invalidate the claim to be sold in the distributed ledger as information on the claim to be sold.

9. The labor claim transaction system according to claim 7, wherein the information on the claim to be sold includes a payment date when the claim amount is paid to the specific buyer, the financial institution node identifies the claim to be sold the payment date of which is reached with reference to the distributed ledger, executes transfer processing to transfer the claim amount of the identified claim to be sold, from the employers account to the specific buyer's account, and then, records claim amount transfer completion information in the distributed ledger and transmits a notification of completion of transfer of the claim amount, to the mediator node, and in response to the transfer completion notification, the mediator node records invalidation information to invalidate the claim to be sold in the distributed ledger as information on the claim to be sold.

\* \* \* \* \*